US012372902B2

(12) United States Patent
Izumichi et al.

(10) Patent No.: US 12,372,902 B2
(45) Date of Patent: Jul. 29, 2025

(54) IMAGE FORMING APPARATUS THAT ALLOWS SHEET JAM REMOVAL WITH A SIDE COVER OPEN

(71) Applicant: KYOCERA Document Solutions Inc., Osaka (JP)

(72) Inventors: Sachio Izumichi, Osaka (JP); Masayuki Kakuta, Osaka (JP); Takuro Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/604,675

(22) Filed: Mar. 14, 2024

(65) Prior Publication Data

US 2024/0319637 A1 Sep. 26, 2024

(30) Foreign Application Priority Data

Mar. 24, 2023 (JP) ................................ 2023-047616

(51) Int. Cl.
*G03G 15/20* (2006.01)
*G03G 15/00* (2006.01)
*G03G 21/16* (2006.01)

(52) U.S. Cl.
CPC ..... *G03G 15/2028* (2013.01); *G03G 15/5054* (2013.01); *G03G 21/1638* (2013.01)

(58) Field of Classification Search
CPC ........... G03G 15/2028; G03G 15/5054; G03G 15/234; G03G 15/70; G03G 21/1638; G03G 2215/00544; G03G 2221/1675
See application file for complete search history.

(56) References Cited

U.S. PATENT DOCUMENTS

2015/0239689 A1* 8/2015 Taniguchi .......... G03G 21/1633 271/264
2016/0085209 A1* 3/2016 Nakamura ............... B65H 9/00 399/92
2017/0255138 A1* 9/2017 Takahashi ............ G03G 15/234
2018/0217553 A1* 8/2018 Yasui ................. G03G 21/1638
2021/0191306 A1* 6/2021 Tobinaga ........... G03G 15/6558

FOREIGN PATENT DOCUMENTS

JP 2012-242736 A 12/2012

* cited by examiner

*Primary Examiner* — Sandra Brase
(74) *Attorney, Agent, or Firm* — Stein IP, LLC

(57) ABSTRACT

An image forming apparatus includes an image forming portion that forms a toner image on an image carrier, a transfer portion, a fixing portion, a discharge portion, a pair of conveyance rollers, a sheet conveyance passage, a duplex conveyance passage, and a side cover. The side cover forms the outer surface of the duplex conveyance passage. In a manner coordinated with the opening of the side cover, one of the pair of conveyance rollers moves in a direction away from the other of the pair of conveyance rollers to open part of the sheet conveyance passage from the pair of conveyance rollers to the discharge portion.

3 Claims, 3 Drawing Sheets

IMAGE FORMING APPARATUS THAT ALLOWS SHEET JAM REMOVAL WITH A SIDE COVER OPEN

INCORPORATION BY REFERENCE

This application is based on and claims the benefit of priority from Japanese Patent Application No. 2023-047616 filed on Mar. 24, 2023, the contents of which are hereby incorporated by reference.

BACKGROUND

The present disclosure relates to electrophotographic type image forming apparatuses such as copiers, printers, facsimile machines, and multifunction peripherals thereof, and relates in particular to intermediate transfer type image forming apparatuses in which toner images that are primarily transferred to an intermediate transfer member are secondarily transferred to a recording medium.

A conventional image forming apparatus includes an image forming portion that forms a toner image on an image carrier, a transfer portion, a fixing portion, a discharge portion, a pair of conveyance rollers, a duplex conveyance passage, and a side cover. The transfer portion transfers a toner image formed in the image forming portion to a recording medium. The fixing portion fuses and fixes the toner image transferred in the transfer portion to the recording medium. The discharge portion discharges the recording medium having the toner image fixed to it in the fixing portion. The pair of conveyance rollers feeds out the recording medium from the fixing portion to the discharge portion. The duplex conveyance passage switches back the recording medium guided to the discharge portion to convey the recording medium again to the transfer portion. The side cover forms the outer surface of the duplex conveyance passage. If a jam (sheet jam) occurs in the duplex conveyance passage, the side cover is opened to remove the sheet jam.

This known technology suffers from inefficient sheet jam removal when a jam occurs downstream of the fixing portion.

SUMMARY

According to one aspect of the present disclosure, an image forming apparatus includes an image forming portion that forms a toner image on an image carrier, a transfer portion, a fixing portion, a discharge portion, a pair of conveyance rollers, a sheet conveyance passage, a duplex conveyance passage, and a side cover. The transfer portion transfers a toner image formed in the image forming portion to a recording medium. The fixing portion has a pair of fixing rollers that forms a fixing nip at which the unfixed toner image transferred in the transfer portion is fused and fixed to the recording medium. The discharge portion discharges the recording medium having the toner image fixed to it in the fixing portion. The pair of conveyance rollers feeds out the recording medium from the pair of fixing rollers to the discharge portion. The duplex conveyance passage switches back the recording medium guided to the discharge portion to convey the recording medium again to the transfer portion. The side cover forms the outer surface of the duplex conveyance passage. In a manner coordinated with the opening of the side cover, one of the pair of conveyance rollers moves in a direction away from the other of the pair of conveyance rollers to open part of the sheet conveyance passage from the pair of conveyance rollers to the discharge portion.

Other objects of the present disclosure and specific advantages obtained by the preset disclosure will become clearer from the following description of the embodiments.

DETAILED DESCRIPTION

Figure 1:
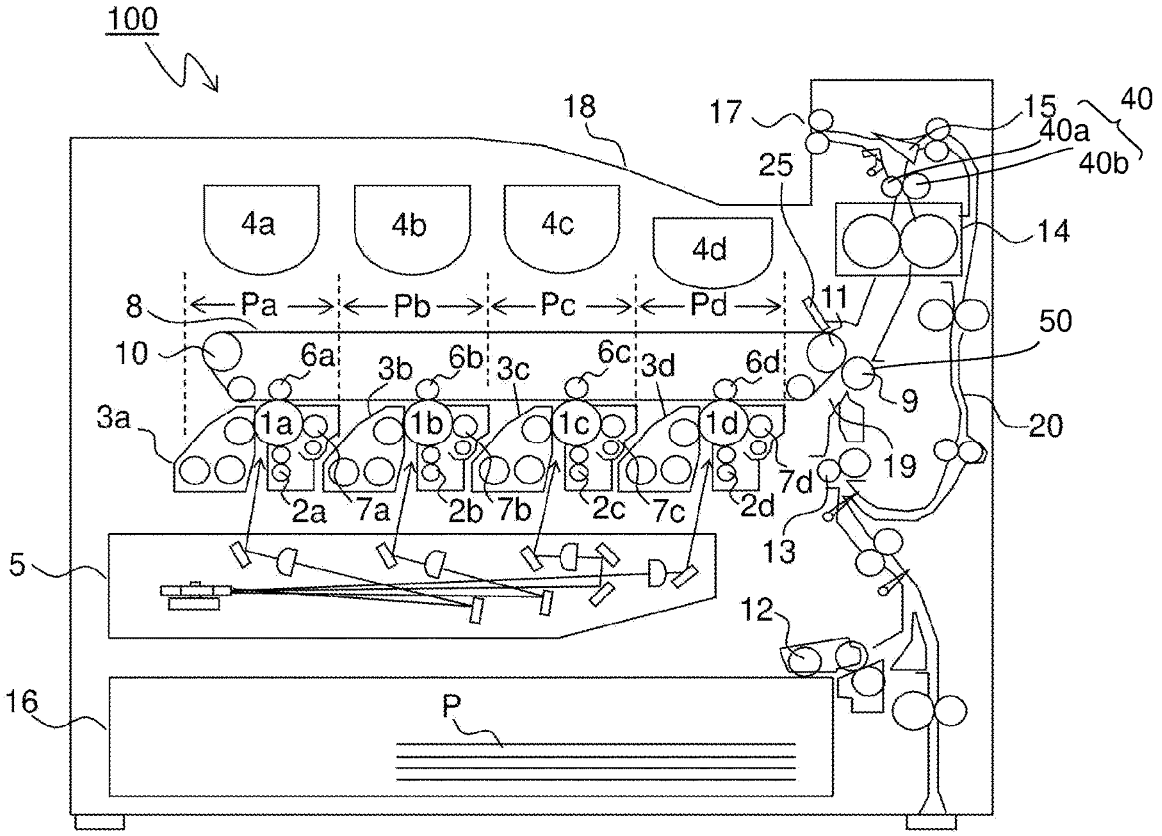
FIG. 1 is a schematic sectional view showing the overall structure of an image forming apparatus 100 according to an embodiment of the present disclosure.

Hereinafter, an embodiment of the present disclosure will be described with reference to the drawings. FIG. 1 is a sectional view showing the internal structure of an image forming apparatus 100 according to an embodiment of the present disclosure. The image forming apparatus 100 includes image forming portions Pa to Pd, a transfer portion 50, a fixing portion 14, a discharging portion 17, a pair of conveyance rollers 40, a sheet conveyance passage 19, a duplex conveyance passage 20, and a side cover 21.

In a main body of the image forming apparatus 100 (here, a color printer), four image forming portions Pa, Pb, Pc, and Pd are arranged in this order from upstream (left side in FIG. 1) in the conveyance direction. The image forming portions Pa to Pd are provided so as to correspond to images of four different colors (yellow, cyan, magenta, and black). The image forming portions Pa to Pd sequentially form yellow, cyan, magenta, and black images, each through processes of electrostatic charging, exposure to light, image development, and image transfer.

In the image forming portions Pa to Pd are arranged photosensitive drums (image carrier) 1*a*, 1*b*, 1*c*, and 1*d*, which carry visible images (toner images) of different colors. That is, the image forming portions Pa to Pd form visible images (toner images) of different colors on the photosensitive drums (image carriers) 1*a* to 1*d*. An intermediate transfer belt (intermediate transfer member) 8 that rotates counterclockwise in FIG. 1 is provided adjacent to the image forming portions Pa to Pd. The toner images formed on the photosensitive drums 1*a* to 1*d* are primarily transferred sequentially and overlaid on each other on the intermediate transfer belt 8 which moves while in contact with the photosensitive drums 1*a* to 1*d*.

The transfer portion 50 transfers the toner images formed in the image forming portions Pa to Pd to a transfer sheet P (recording medium). The transfer portion 50 has a driving roller 11 and a secondary transfer roller 9. Specifically, the toner images primarily transferred to the intermediate transfer belt 8 are secondarily transferred by the secondary transfer roller 9 to the transfer sheet P as an example of a recording medium. The transfer sheet P having the toner image secondarily transferred to it, after the toner image is fixed in the fixing portion 14, is discharged out of the main body of the image forming apparatus 100. While the photosensitive drums 1*a* to 1*d* rotate clockwise in FIG. 1, an image forming process is performed with respect to each of the photosensitive drums 1*a* to 1*d*.

The transfer sheet P to which the toner images are to be secondarily transferred is stored inside a sheet cassette 16 arranged in a bottom part in the main body of the image forming apparatus 100. The transfer sheet P is conveyed via a sheet feed roller 12 and a pair of registration rollers 13 along the sheet conveyance passage 19 to a nip portion between the secondary transfer roller 9 and the driving roller 11 for the intermediate transfer belt 8. The intermediate transfer belt 8 is typically an endless (seamless) belt formed of a dielectric resin sheet. Downstream of the secondary transfer roller 9, a blade-form belt cleaner 25 is arranged for removing the toner and the like remaining on the surface of the intermediate transfer belt 8.

Next, the image forming portions Pa to Pd will be described. Around and below the photosensitive drums 1*a* to 1*d*, which is rotatably arranged, there are provided charging devices 2*a*, 2*b*, 2*c*, and 2*d*, an exposure device 5, development devices 3*a*, 3*b*, 3*c*, and 3*d*, and cleaning devices 7*a*, 7*b*, 7*c*, and 7*d*. The charging devices 2*a*, 2*b*, 2*c*, and 2*d* electrostatically charge the photosensitive drums 1*a* to 1*d*. The exposure device 5 shines light carrying image information onto the photosensitive drums 1*a* to 1*d*. The development devices 3*a*, 3*b*, 3*c*, and 3*d* form toner images on the photosensitive drums 1*a* to 1*d*. The cleaning devices 7*a*, 7*b*, 7*c*, and 7*d* remove the developer (toner) and the like remaining on the photosensitive drums 1*a* to 1*d*.

When image data is fed in from a host device such as a personal computer, first, the charging devices 2*a* to 2*d* electrostatically charge the surfaces of the photosensitive drums 1*a* to 1*d* uniformly. Next, the exposure device 5 irradiates the photosensitive drums 1*a* to 1*d* with light according to image data to form on them electrostatic latent images according to image data. The development devices 3*a* to 3*d* are loaded with predetermined amounts of two-component developer containing toner of different colors, namely yellow, cyan, magenta, and black respectively. When, as image formation proceeds as will be described later, the proportion of the toner in the two-component developer in the development devices 3*a* to 3*d* falls below a prescribed value, toner is supplied from toner containers 4*a* to 4*d* to the development devices 3*a* to 3*d*. The toner in the developer is fed from the development devices 3*a* to 3*d* to the photosensitive drums 1*a* to 1*d* and electrostatically adhere to them. Thus, toner images are formed according to the electrostatic latent images formed by exposure to light from the exposure device 5.

Then, primary transfer rollers 6*a* to 6*d* apply an electric field at a predetermined transfer voltage between the primary transfer rollers 6*a* to 6*d* and the photosensitive drums 1*a* to 1*d*, and thereby the yellow, cyan, magenta, and black toner images on the photosensitive drums 1*a* to 1*d* are primarily transferred to the intermediate transfer belt 8. These images are formed with a predetermined positional relationship. After that, in preparation for the subsequent formation of new electrostatic latent images, the toner and the like remaining on the surfaces of photosensitive drums 1*a* to 1*d* after primary transfer are removed by cleaning devices 7*a* to 7*d*.

The intermediate transfer belt 8 is wound around a driven roller 10, arranged upstream, and the driving roller 11, arranged downstream. As the driving roller 11 is rotated by a belt driving motor (not illustrated), the intermediate transfer belt 8 starts rotating counterclockwise, and the transfer sheet P is conveyed at a predetermined timing from the pair of registration rollers 13 to a secondary transfer nip portion N (see FIG. 2) between the driving roller 11 and the secondary transfer roller 9 provided next to it. The toner images formed on the intermediate transfer belt 8 are secondarily transferred to the transfer sheet P passing through the secondary transfer nip portion N.

The transfer sheet P having the toner images secondarily transferred to it is conveyed to the fixing portion 14. The fixing portion 14 has a pair of fixing rollers 140. The pair of fixing rollers 140 is composed of a fixing belt 14*a* and a pressing roller 14*b* (see FIG. 2 for both). The fixing belt 14*a* is heated with a heating device such as a heater or an induction heating portion (not illustrated). The pressing roller 14*b* is kept in pressed contact with the fixing belt 14*a* to form a fixing nip N1 and applies a rotational driving force to the fixing belt 14*a*. That is, the fixing portion 14 has the pair of fixing rollers 140 forming the fixing nip N1 at which the unfixed toner images transferred in the transfer portion 50 are fused and fixed to the transfer sheet P (recording medium).

The transfer sheet P conveyed to the fixing portion 14 is heated and pressed by the fixing belt 14*a*; thus the pressing roller 14*b* and the toner images are fixed to the surface of the transfer sheet P and a predetermined full-color image is formed. The transfer sheet P with the full-color image formed on it is conveyed via the pair of conveyance rollers 40 and then its conveyance direction is switched by a conveyance guide member 15 arranged in a branching portion of the sheet conveyance passage 19 so as to be discharged as it is (or after being diverted to a duplex conveyance passage 20 to have images formed on both sides) to a discharge tray 18 by a pair of discharge rollers 17 (discharge portion). That is, the pair of discharge rollers 17 (discharge portion) discharges the transfer sheet P (recording medium) having the toner image fixed to it in the fixing portion 14. The pair of conveyance rollers 40 feeds out the transfer sheet P (recording medium) from the pair of fixing rollers 140 to the pair of discharge rollers (discharge portion) 17.

The sheet conveyance passage 19 communicates with the discharge tray 18 or the duplex conveyance passage 20 downstream of the pair of conveyance rollers 40. In this embodiment, the pair of conveyance rollers 40 is composed of a driving conveyance roller 40*a* and a driven conveyance roller 40*b*. The driving conveyance roller 40*a* is driven by the motor (not illustrated) and the driven conveyance roller 40*b* rotates by following the driving conveyance roller 40*a*.

Figure 2:
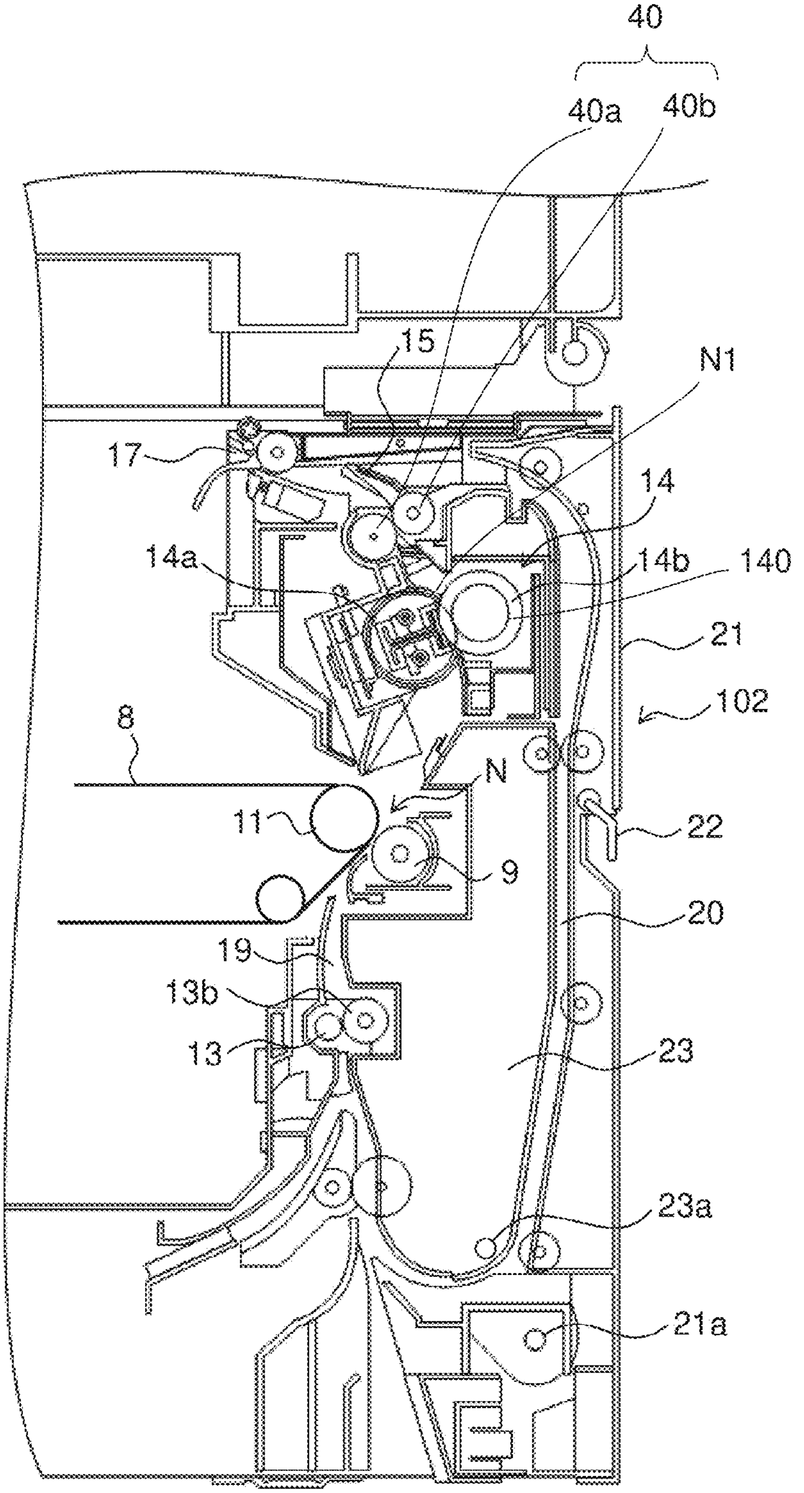
FIG. 2 is a part sectional view around a sheet conveyance passage 19 and a duplex conveyance passage 20 in the image forming apparatus 100 according to the embodiment of the preset disclosure.
Figure 3:
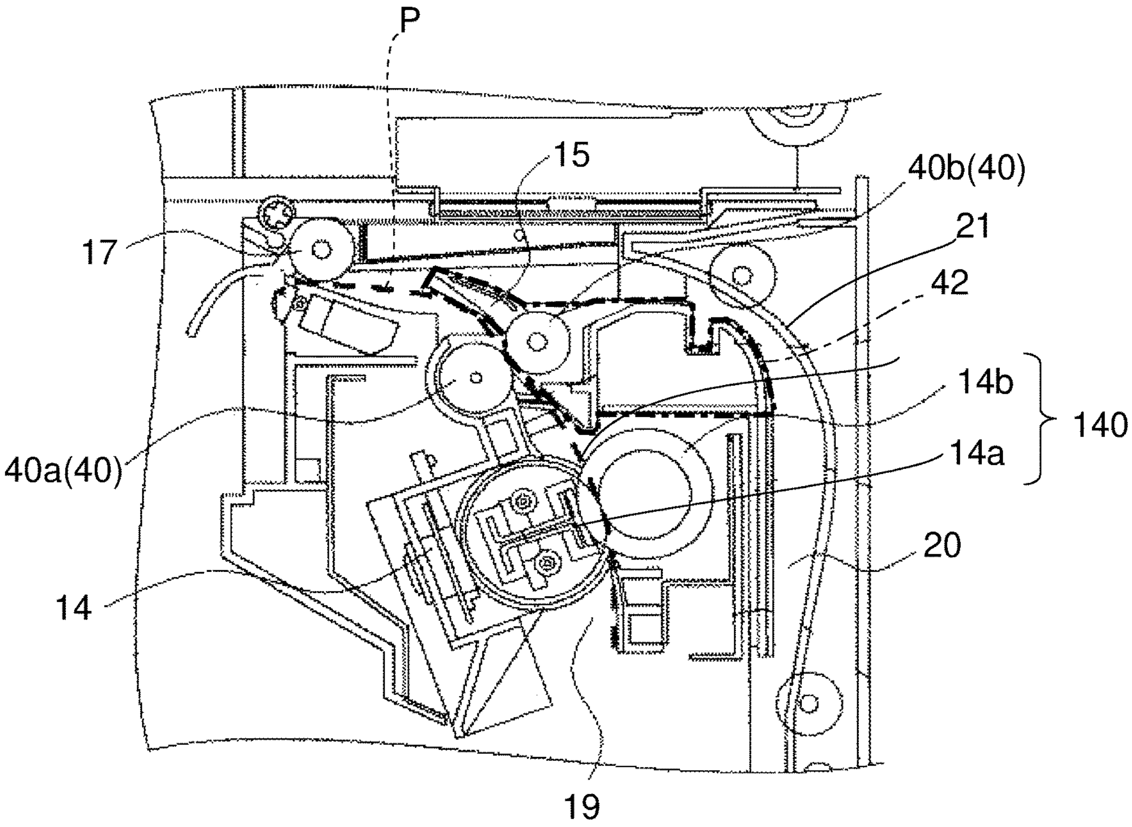
FIG. 3 is an enlarged part sectional view around a fixing portion 14 in FIG. 2.

FIG. 2 is a part sectional view around the sheet conveyance passage 19 and the duplex conveyance passage 20 in the image forming apparatus 100 and FIG. 3 is an enlarged part sectional view around the fixing portion 14 in FIG. 2. In FIG. 3, a conveyance cover 42 is indicated with a dash-and-dot line.

A side cover 21 constitutes a side face 102 of the image forming apparatus 100 and is pivotably supported on a cover shaft 21*a* that is provided in a lower part of the main body of the image forming apparatus 100.

At a side edge of the side cover 21, a hook 22 is provided. The hook 22 keeps the side cover 21 closed by engaging with engagement pins (not illustrated) provided on a front frame and a rear frame of the main body of the image forming apparatus 100. The inner surface of the side cover 21 constitutes the outer surface of the duplex conveyance passage 20. That is, the side cover 21 of the apparatus main body constitutes the outer surface of the duplex conveyance passage 20.

Inward of the side cover 21 is arranged a conveyance unit 23. The conveyance unit 23 is supported on the main body of the image forming apparatus 100 so as to be pivotable about a unit shaft 23*a* and the conveyance unit 23 constitutes part of the conveyance face of the duplex conveyance passage 20 and the sheet conveyance passage 19.

The duplex conveyance passage 20 extends between the inner surface of the side cover 21 and the outer surface of the conveyance unit 23 along the side face 102 of the image forming apparatus 100 in the up-down direction, then curves substantially in a C-shape to join the sheet conveyance passage 19. The inner surface of the conveyance unit 23 is fitted with, in order from upstream (bottom in FIG. 2) in the conveyance direction of the transfer sheet P, a one-side roller 13*b* and the secondary transfer roller 9 constituting the pair of registration rollers 13.

The conveyance cover 42 is arranged downstream of (above) the pressing roller 14*b* and constitutes part (the inner surface and the lower face) of the duplex conveyance passage 20 and part (the outer surface) of the sheet conveyance passage 19. On the face of the conveyance cover 42 constituting the sheet conveyance passage 19, the driven conveyance roller 40*b* and a sheet detection sensor (not illustrated) are arranged. The sheet detection sensor detects the passage of the leading or trailing end of the sheet. In this embodiment, the conveyance guide member 15 is swingably supported at the tip of the conveyance cover 42. The conveyance guide member 15 may be arranged apart from the conveyance cover 42.

The driving conveyance roller 40*a* is arranged in the main body of the image forming apparatus 100, which includes the pair of discharging rollers (discharge portion) 17, the pair of fixing rollers 140, and the image forming portions Pa to Pd. That is, the driving conveyance roller 40*a* (the other of the pair of conveyance rollers 40) is coupled to the pair of discharging rollers (discharge portion) 17.

The conveyance cover 42 is arranged so as to be movable away from the pair of fixing rollers 140 and the driving conveyance roller 40*a* and is coupled to the side cover 21. Thus, when the side cover 21 is pivoted in the opening direction with respect to the image forming apparatus 100, also the conveyance cover 42 pivots in the opening direction together with the side cover 21.

As a result, the duplex conveyance passage 20 arranged downstream of the conveyance cover 42 is exposed over a wide range. In a manner coordinated with the opening of the side cover 21, the driven conveyance roller 40*b* (one of the pair of conveyance rollers 40) attached to the conveyance cover 42 moves in the direction away from the driving conveyance roller 40*a* (the other of the pair of conveyance rollers 40). In this way, part of the sheet conveyance passage 19 from the pair of the conveyance rollers 40 to the pair of discharging rollers (discharge portion) 17 is opened. Thus, the fixing nip N1 is exposed.

In a manner coordinated with the opening of the side cover 21, the driven conveyance roller 40*b* (one of the pair of the conveyance rollers 40) rotates by following the rotation of the driving conveyance roller 40*a* (the other of the pair of conveyance rollers 40). Thus, there is no need to arrange a driving motor around the conveyance cover 42 and this helps reduce the weight around the conveyance cover 42. This makes it easier to open and close the side cover 21 with which the conveyance cover 42 is coordinated.

By contrast, pivoting the side cover 21 in the closing direction makes also the conveyance cover 42 pivot in the closing direction together with the side cover 21. Thus, the driven conveyance roller 40*b* is pressed against the driving conveyance roller 40*a*.

If a sheet jam occurs in the sheet conveyance passage 19 downstream of the pair of fixing rollers 140, the side cover 21 is pivoted in the opening direction with respect to the image forming apparatus 100. In a manner coordinated with the opening of the side cover 21, the driven conveyance roller 40*b* (one of the pair of conveyance rollers 40) moves to expose the sheet conveyance passage 19 from the pair of conveyance rollers 40 to the pair of discharging rollers 17 and sheet jam removal is possible.

Thus, with one operation of pivoting the side cover 21, the fixing nip N1 can be exposed and the sheet conveyance passage 19 from the pair of the conveyance rollers 40 to the pair of discharging rollers (discharge portion) 17 can be exposed over a wide range. It is thus possible to enhance the efficiency of sheet jam removal. Closing the side cover 21 permits also the conveyance cover 42 to close, and this helps further enhance the efficiency of sheet jam removal.

Rotating the side cover 21 together with the conveyance unit 23 in the opening direction permits the conveyance unit 23 to move away from the image forming apparatus 100, which includes the image forming portions Pa to Pd. Thus, the sheet conveyance passage 19 downstream of the pair of fixing rollers 140 is exposed over a wide range. By contrast, pivoting the side cover 21 together with the conveyance unit 23 in the closing direction permits the conveyance unit 23 to make contact with the image forming apparatus 100 so that the secondary transfer roller 9 is pressed against the driving roller 11 via the intermediate transfer belt 8.

If a sheet jam occurs in the sheet conveyance passage 19 upstream of the fixing portion 14, the side cover 21 is pivoted together with the conveyance unit 23 in the opening direction. Thus, the conveyance unit 23 moves away from the apparatus main body of the image forming apparatus 100. As a result, the secondary transfer roller 9 and one-side roller 13*b* of the pair of registration rollers 13 are arranged in the conveyance unit 23; thus opening the conveyance unit 23 permits part (upstream of the fixing portion 14) of the sheet conveyance passage 19 to be exposed and this makes sheet jam removal possible.

The conveyance cover 42 may be coupled to the side cover 21 so as to be movable away from it. If a sheet jam occurs in the duplex conveyance passage 20 facing the conveyance cover 42 above the pressing roller 14*b*, the conveyance cover 42 is moved away and only the side cover 21 is pivoted in the opening direction. Thus, the duplex conveyance passage 20 facing the conveyance cover 42 is exposed and this makes sheet jam removal possible.

The present disclosure is not limited to the above embodiments and can be carried out with any modifications made without departure from the spirit of the preset disclosure. For example, in the above embodiments, the side cover 21 and the conveyance cover 42 are configured to open and close at the rear side of the apparatus (right side in FIG. 1), but for another example, the duplex conveyance passage 20 may be provided along a side face of the apparatus (at the near side of the plane of FIG. 1) and the side cover 21 and the conveyance cover 42 may be configured to open and close at the side of the apparatus.

The pair of conveyance rollers 40 may have the driving conveyance roller 40*a* arranged in the conveyance cover 42 side and have the driven conveyance roller 40*b* arranged in the apparatus main body side.

The present disclosure is applicable not only to color copiers but also to other vertical conveyance type image forming apparatuses such as analog copiers, digital multifunction peripherals, monochrome and color printers, and facsimile machines.

What is claimed is:

1. An image forming apparatus comprising:

an image forming portion that forms a toner image on an image carrier;

a transfer portion that transfers to a recording medium the toner image formed in the image forming portion;

a fixing portion having a pair of fixing rollers that forms a fixing nip at which the unfixed toner image transferred in the transfer portion is fused and fixed to the recording medium;

a discharge portion that discharges the recording medium having the toner image fixed thereto in the fixing portion;

a pair of conveyance rollers that feeds out the recording medium from the pair of fixing rollers to the discharge portion;

a sheet conveyance passage that connects together the image forming portion, the transfer portion, the fixing portion, and the discharge portion;

a duplex conveyance passage that switches back the recording medium guided to the discharge portion to convey the recording medium again to the transfer portion; and a conveyance guide member that switches the recording medium having passed through the pair of conveyance rollers between the discharge portion and the duplex conveyance passage;

a conveyance cover that constitutes part of the sheet conveyance passage, the conveyance cover having attached thereto one of the pair of conveyance rollers arranged; and a side cover of an apparatus main body, the side cover forming an outer surface of the duplex conveyance passage, wherein the conveyance guide member is swingably supported on the conveyance cover, and in a manner coordinated with opening of the side cover, together with the conveyance cover and the conveyance guide member, one of the pair of conveyance rollers moves in a direction away from another of the pair of conveyance rollers to open part of the sheet conveyance passage from the pair of conveyance rollers to the discharge portion.

2. The image forming apparatus according to claim 1, wherein the another of the pair of conveyance rollers is coupled to the discharge portion, and as, in a manner coordinated with the opening of the side cover, the one of the pair of conveyance rollers moves in the direction away from the another of the pair of conveyance rollers, the fixing nip is exposed.

3. The image forming apparatus according to claim 1, wherein one of the pair of the conveyance rollers rotates by following rotation of another of the pair of conveyance rollers.

* * * * *